No. 664,816. Patented Dec. 25, 1900.
F. A. MILLS.
PNEUMATIC SHUTTLE AND PICKER STAFF BUFFER FOR LOOMS.
(Application filed Apr. 19, 1900.)
(No Model.) 4 Sheets—Sheet 2.
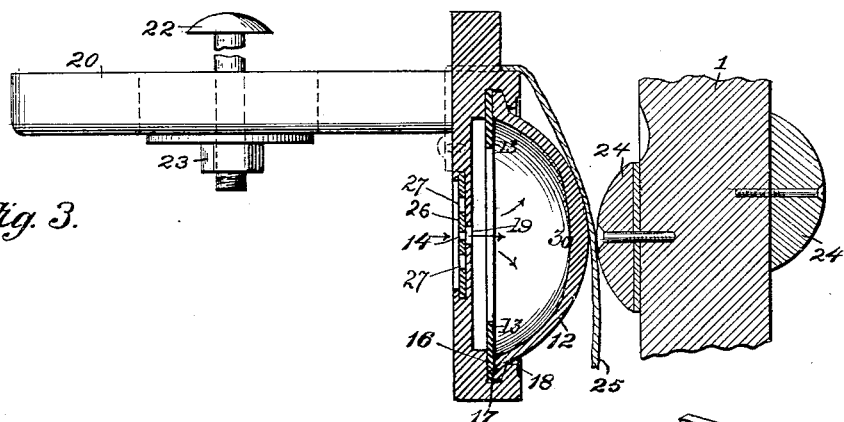
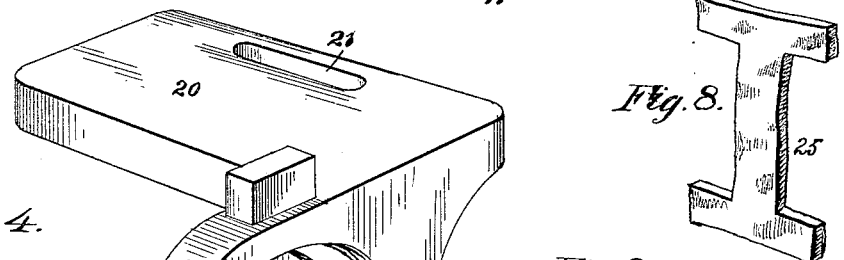
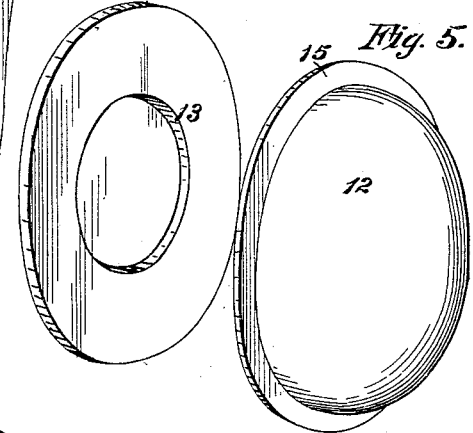
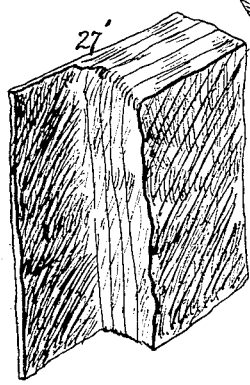
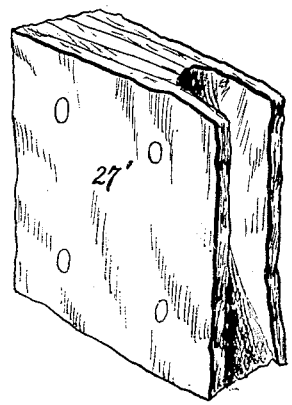

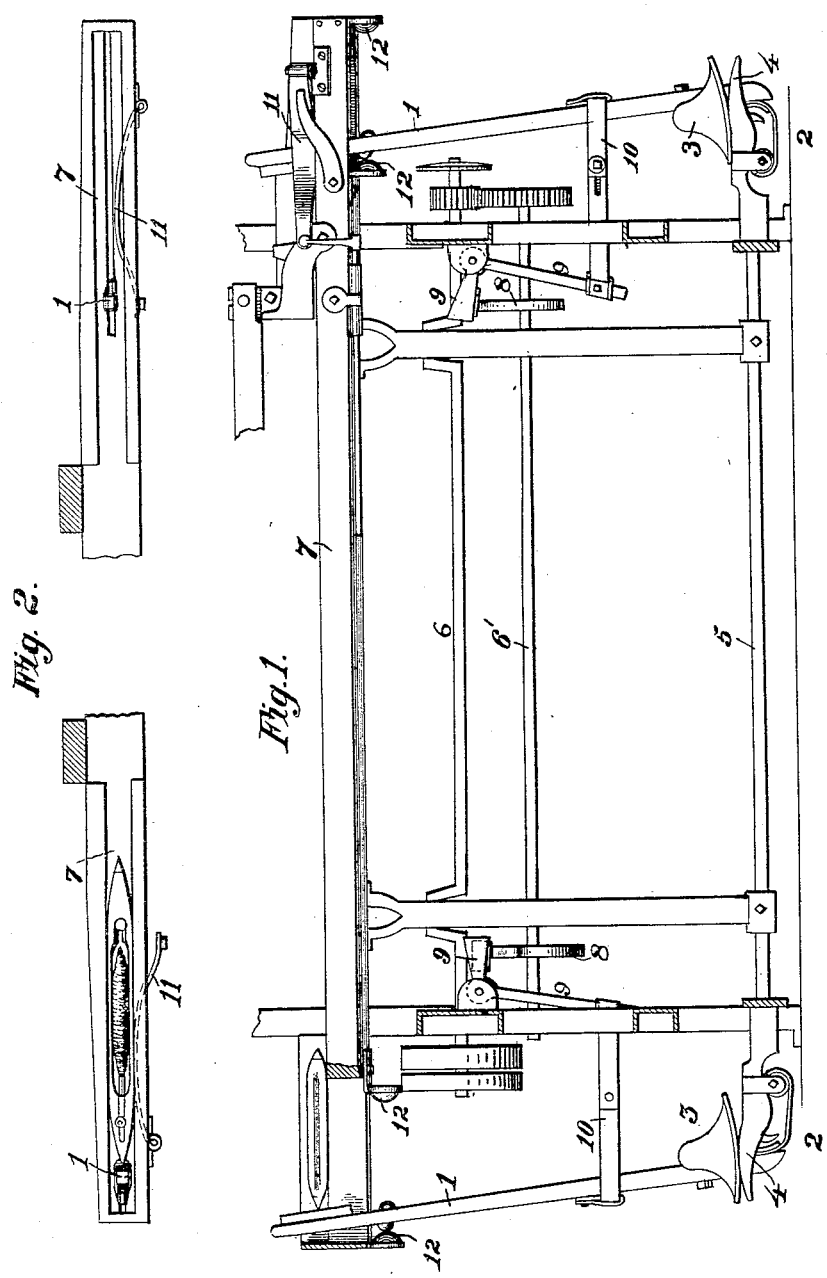

No. 664,816. Patented Dec. 25, 1900.
F. A. MILLS.
PNEUMATIC SHUTTLE AND PICKER STAFF BUFFER FOR LOOMS.
(Application filed Apr. 19, 1900.)
(No Model.) 4 Sheets—Sheet 3.
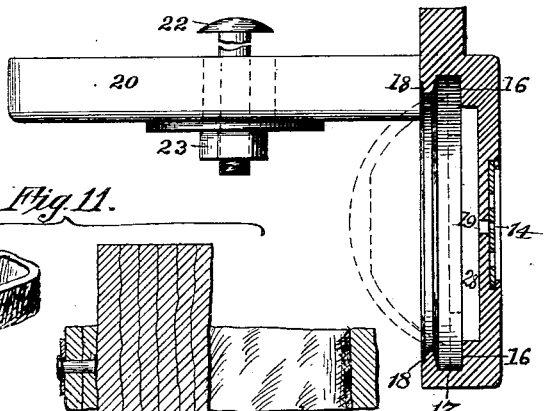
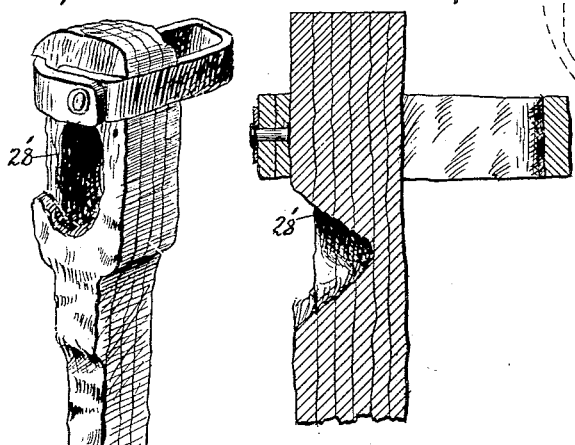
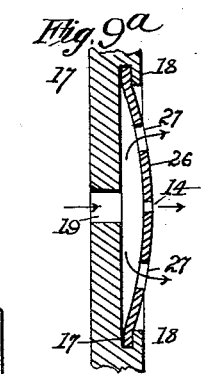
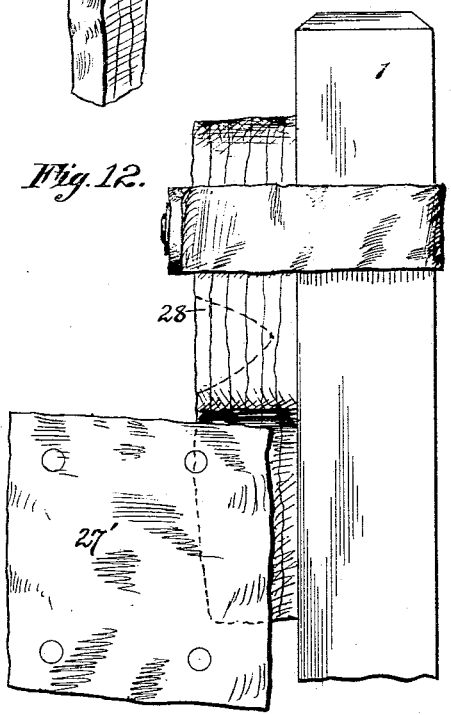
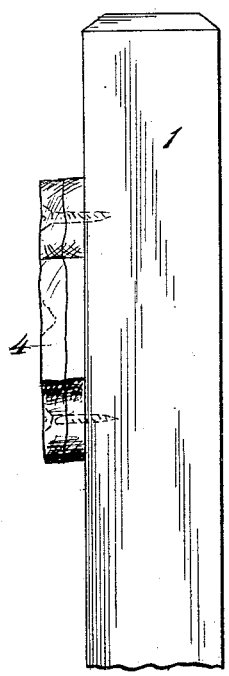
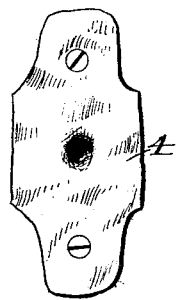
Witnesses.
Inventor.
Francis Arthur Mills
by Johnson & Johnson
Attorneys.

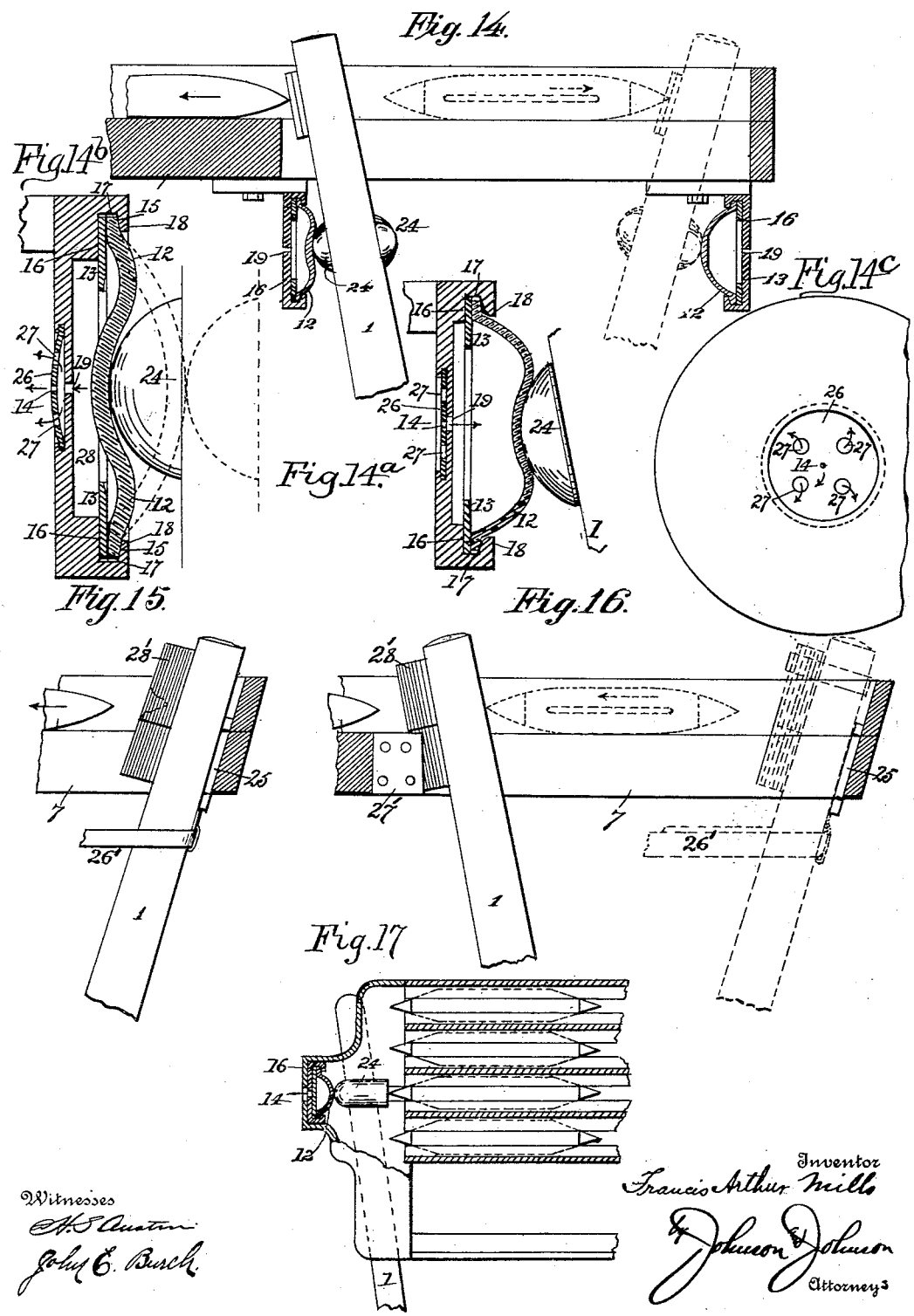

UNITED STATES PATENT OFFICE.

FRANCIS ARTHUR MILLS, OF METHUEN, MASSACHUSETTS, ASSIGNOR OF ONE-HALF TO GROSVENOR B. EMMONS, OF SAME PLACE.

PNEUMATIC SHUTTLE AND PICKER-STAFF BUFFER FOR LOOMS.

SPECIFICATION forming part of Letters Patent No. 664,816, dated December 25, 1900.

Application filed April 19, 1900. Serial No. 13,496. (No model.)

*To all whom it may concern:*

Be it known that I, FRANCIS ARTHUR MILLS, a citizen of the United States, residing at Methuen, in the county of Essex and State of Massachusetts, have invented certain new and useful Improvements in Rubber Pneumatic Shuttle and Picker-Staff Buffers for Looms, of which the following is a specification.

The following description of my improvement in rubber shuttle checks or buffers for looms read in connection with the drawings will enable any one skilled in the art to which my invention relates to understand its nature and the objects aimed at and to practice it in the form in which I prefer to employ it.

The picker-staffs operating with the necessary force to drive the shuttle through the shed from one shuttle-box to the other with the loom running at a high speed are the greatest factors in the destruction and cause of breaking the cop and accidents to the working parts of the loom. To prevent the rebound of the shuttle, which causes it and the picker to stand apart, as seen in Figures 15 and 16, and which is so effective in destroying the picker, as seen in Figs. 11 and 12, various devices have been proposed for use, and for this purpose picker-staff check-straps and check-springs for the shuttle are now generally used; but these springs cause considerable frictional pressure upon the shuttle at both ends of the lay, which, while increasing the wear of the shuttle, also requires an increase of power to throw the shuttle out of one box into the other. The provision whereby the picker-staff and the picker are operated to throw the shuttle when the two are in contact, as seen in Figs. 1 and 14, and the provision whereby the shuttle, picker, and picker-staff blows are arrested with a dead soft non-rebounding impact in receiving the shuttle are improvements effecting for the better the operation of most all the working parts of a loom.

Referring to the drawings, Fig. 1 shows in front view the shuttle-race lay, the picker-staffs, and the actuating mechanism of these parts to illustrate the relation thereto of my improvement. Fig. 2 shows in top view the shuttle-raceway broken apart and the picker-staffs in the slots of the lay-race boxes. Fig. 3 shows in vertical section my pneumatic rubber buffer in its seating and holding chambered bracket, by which it is secured to the race-lay beam, and that part of the picker-staff the blows of which are arrested by the pneumatic rubber buffer, so that the picker-staff or the shuttle has no rebound and the blows are rendered noiseless. Fig. 4 shows the bracket undercut seat and self-sealing chambered holder for the pneumatic rubber buffer. Fig. 5 shows the pneumatic rubber buffer and its circumferential seating and sealing rim, by which it is securely self-fastened in its holder; and Fig. 6 is a separate rubber base-ring which coöperates with the rim of the pneumatic buffer to form a circumferential air-tight seal for the latter within the holder. Fig. 7 shows two blocks of leather pieces which form the lay-buffers used in looms of to-day and which show how they are destroyed by the cam-actuated blows of the picker-staff. These block-buffers my improvement dispenses with. Fig. 8 shows the leather buffer which is used at the end of the race-lay shuttle-box in connection with the usual check-strap to receive the spring-rebounding blows of the picker-staff and the blows of the shuttle, as in Figs. 15 and 16, and my improvement dispenses with this buffer and check-strap. Fig. 9 shows in vertical section the seating and holding chambered bracket for the pneumatic rubber buffer as applied at the end of the race-lay to receive the shuttle-blow on the picker-staff. Fig. 9$^a$ shows enlarged the flexible valve of the buffer-holder as bulged by the air forced out under the collapsing force of the flight of the shuttle by the cam-actuated throw of the picker-staff; and Fig. 10 shows in section the rimmed pneumatic buffer, its sealing-ring being shown as when vulcanized to the sealing-rim of the buffer and its crown of increased thickness. Fig. 11 represents views of the leather pickers of the picker-staffs to show the way in which they are now destroyed in looms by the blows in receiving and shooting a shuttle across the loom. Fig. 12 shows the leather picker of the picker-staff and the leather block-buffer of the race-lay and the manner in which they are now both destroyed in looms. Fig. 13 shows the leather picker which may be used on the staff with my improvement and which takes the place of the picker seen in Figs. 11 and 12. Fig. 14 shows the pneumatic buffer as having received the cam-actuated blow of the picker-staff and buffer as collapsed by such blow, and in dotted lines the shuttle is seen in its position after having struck the picker and maintained its contact with the picker ready to shoot the shuttle. It is this contact throw which is distinguished from a striking throw, as in Figs. 15 and 16, which is the old construction, in which the shuttle strikes the picker and then rebounds and is again struck by the picker to throw the shuttle, thus causing two blows upon the picker for each pick, which causes double the amount of wear to the picker and inaccurate throwing of the shuttle. Fig. 14ª shows the pneumatic rubber buffer in section and partially collapsed by the picker-button and expanding to its normal position, and thereby slowly sucking the air into the air-space of the buffer through its bracket-base vent. Fig. 14ᵇ shows in section, enlarged, the pneumatic rubber buffer and its sealing and holding chambered bracket and the buffer as fully collapsed, the cushioning-air having thereby been forced out through the vent in the holding-bracket. Fig. 14ᶜ shows a face view of the flexible valve which permits the air to be forced out faster than it can be drawn into the buffer. Fig. 15 shows the picker-staff, its picker, and the shuttle in its rebounded position after having struck the picker, and this is what my improvement avoids. Fig. 16 is given to show in dotted lines the same result and in full lines the shuttle as having been thrown by the cam-actuated throw of the picker-staff and the way in which the leather picker and buffer are destroyed. Fig. 17 shows my improved pneumatic buffer as applied to sliding or changing box-looms in which shuttles of different colors of filling are carried and automatically shifted while the loom is in operation, as will be understood by those skilled in the art.

The purpose of showing the leather pickers and leather block-buffers now in use in looms is to present by comparison the destructive results from their use in the operation of the loom and the avoidance of these results and the highly-important advantages resulting therefrom by my improvement.

As stated, it is the avoidance of the destruction and derangements caused by the cam-actuated blows of the picker-staffs to throw the shuttle through the shed of the warp and arresting it at the end of its flight with a cushioning effect to prevent the breaking of the cop and rebound to the shuttle that is the object of my improvement. The means now generally in use causes the shuttle to be thrown with sharp distinct striking blows that will cause the shuttle to rebound from the picker it strikes, and it is these striking blows of the shuttle against the picker and the picker against the shuttle I find to be the cause of breaking the cop and filling and the chief cause of the destruction of the picker, as seen in Fig. 11, and its disastrous consequences in the working of the loom and liability of throwing the shuttle out of the boxes. To avoid this, springs and check-straps in various forms, arrangements, and constructions have been proposed as means for cushioning the blows of the shuttle upon the picker and of the picker-staffs upon the race-lay box; but so far as I know and can find no such device is in use in looms that will prevent the breaking of the cop and a rebounding movement to the shuttle and of the picker-staff in receiving the shuttle. I find in use looms working with the block leather pickers and buffers (shown in Figs. 7, 11, and 12) composed of a multiple of thick hard leather pieces nailed or cemented together and fixed to the picker-staff and to the race-lay, so that every blow of the picker against the shuttle and the shuttle against the picker effects the gradual destruction of the picker, as shown in the figures referred to. The damage is caused by the cam-actuated throw of the picker-staffs, and the pickers rarely last longer than a period of three months. The blows loosen the picker on the staff, they cause the breaking of the picker-staff, they cause the breaking of the picker-staff check-strap and the lug-strap of the picker-staff to get out of and to require frequent adjustment, and they cause the upsetting and tangling of the filling on the cop or bobbin, the breaking of the cop, and the breaking of the cop-holding spring when the filling is nearly exhausted, and also the wearing out of the bobbin. The picking of deep holes in the pickers causes inaccuracy in the throw of the shuttle and its entanglement in the shed. The hammering of the picker-staffs in their to-and-fro blows produces great noise, and they cause the loosening of the nuts and bolts in the loom. The violence of the blows of the shuttle against the picker-staffs at the ends of the race-lay bursts out the ends or head-blocks. From all these causes the loom requires constant fixing and care and is often stopped. In preventing the causes of all these things my improvement has, among others, the following advantages: It renders the pickers more durable; it prevents the picker-staffs from being broken; it dispenses with the block-buffers in the slots of the race-lay; it dispenses with the use of the check-straps of the picker-staffs; it prevents the breaking of the cop and the entanglement and breaking of the filling; it avoids the necessity of tight shuttle-binders in the race-boxes, and thereby reduces the wear of the shuttle to a minimum; it allows the use of larger cops without breakage and of smaller pickers and lighter picker-staffs; it increases the durability and lessens the cost of maintaining the picker-staffs and their actuating connections; it saves time, labor, and cost of fixing the loom; it greatly lessens the causes from which the loom is stopped, and it necessarily increases the capacity of the loom by uninterrupted work, and the speed of the loom can be greatly increased.

The picker-staffs 1 may be mounted and actuated in any suitable manner. The construction of the actuating mechanism shown is that usually provided in which a coiled spring 2 is combined with a rocker 3 and picker-staff for retracting the latter. The rocker-beds 4 are fixed upon the lay-shaft 5, upon which the carrying arms or swords of the race-lay beam 7 are mounted. A power-driven crank-shaft 6 gives the usual vibratory movements to race-lay beam 7, and a shaft 6' carries cams 8, adapted to actuate levers 9, which by means of the usual lug-straps 10 connect the levers and picker-staffs and give the proper throw to the picker-staffs. The lay shuttle-boxes have the usual binder plate-springs 11 for checking the flight of the shuttle, all of which parts may be of the usual or any approved construction.

My pneumatic rubber buffers 12 are seen in Figs. 1 and 14 in their relation to the race-lay beam to receive the blow of the picker-staff in throwing the shuttle and the blow of the picker-staff in being returned by spring force to its normal position. At the left in Fig. 1 the shuttle is seen in the position in which it is received by the picker and prevented from rebounding, so that in being thrown the picker gives a contact throw (as distinguished from striking) of the shuttle, as I shall presently state. The pneumatic buffer may be formed of two separate parts of rubber—a concavo-convex part 12 and a sealing base-ring 13—because this insures durability and convenient simple construction. The rubber buffer is formed with a circumferential flange or rim 15, which serves as the means by which the rubber buffer is secured in the holder upon the sealing rubber ring. The holder is formed with an annular open seat 16, bounded by an undercut groove 17, formed by an overhanging rim 18, and within this groove the buffer parts are jammed and squeezed by hand, so that the base-ring and the rim 15 fill the groove, which will cause the buffer-rim to be self-bound and air-tight within the groove, so that no air can escape around the rim, and the pneumatic buffer part will stand out from the groove, over or behind a chamber in the holder, and may be easily and quickly set in place and, should it become damaged, quickly removed and renewed. I may make the groove flaring outward and the buffer-rim wegde-shaped, whereby to render effective the air-tight binding and self-sealing of the pneumatic part within the groove and upon the sealing-seat. I prefer to make the buffer less than a half-sphere for the purpose of lessening the tendency to form sharp ridges in being collapsed under the blows of the picker or picker-staff button to prevent the buffer from cracking. I may make that part of the wall 30 of the buffer which receives the impact of the picker-staff or picker of greater thickness, the better to withstand the hammering effects and give longer wear, as seen in Figs. 3 and 10. For the same purpose a shield or apron 25, of flexible material, as leather or felt, may be suspended in front of or faced over the pneumatic rubber buffer to receive the impact of the picker-staff button, as in Fig. 3. This shield is of special advantage at the inner buffer, which receives the hard cam-actuated blow of the picker-staff. The seating and holding part for the pneumatic rubber buffer is formed upon a bracket 20, which is secured, preferably, to the under side of the race-lay beam by a nutted bolt 22, which passes through a slot 21 in the bracket and permits the adjustment of the latter to place the buffer in proper relation to the picker-staffs that the impact may be properly delivered upon the buffer according to the desired stroke of the picker-staff. The increasing or diminishing the extent of the stroke of the picker-staff by such adjustment is important, because when a very small shed is used a greater speed and force of the shuttle are desired to give it a harder throw to get it through the shed under the pull of the lug-strap, and this is effected by setting the buffer-holder farther inward on the lay. It is not necessary to make the end buffer-holder adjustable, although it may be. The pneumatic rubber buffer in receiving the blows of the picker-staffs is caused to collapse within the holder-chamber by the escape of the air, and thereby the impact is made a soft dead blow, which will prevent the breaking of the cop. Especially is this important in receiving the shuttle to prevent breaking of the cop and rebound of the shuttle. In throwing the shuttle its impact on the other picker-staff is resisted by the pneumatic rubber buffer, as seen at the left-hand end of the lay in Fig. 1 and in dotted lines at the right-hand end of Fig. 14, and in receiving this impact of the shuttle the picker-staff, being in its normal position of rest against the pneumatic rubber buffer, simply causes its collapse by the displacement of the air, as seen in Fig. 14$^b$. The return of the air into the buffer as it assumes its normal position, as seen by dotted lines in Fig. 14$^b$, has no effect in giving any rebound to the picker-staff, and hence none to the shuttle, and therefore retains the shuttle against the picker, so that having delivered its blow against the picker the shuttle will remain in engagement with the picker to be thrown by it by a sudden pushing action as contradistinguished to a sudden striking blow. The means on the picker-staffs for delivering the blows against the rubber buffers is the provision of convex striker knobs or buttons 24, which are shaped and placed so as to strike the buffer with a central blow, and thereby cause it to be collapsed with regular curves between the circular edges of the striker and the rim by which the buffer is secured and sealed, and for this purpose the striker-knobs are preferably of much less area than the pneumatic buffer, as seen in Figs. 3 and 14ᵇ, and are fixed on the opposite sides of the picker-staff, so that the strikers will be in the paths of said buffers. Obviously these button-buffers could not be used except in coöperation with rubber buffers, and in such coöperation they act to indent the rubber buffer, so as to give a full cushioning effect to the picker-staff. Without these buffers the picker-staffs would strike the bracket-rim, which would destroy the cushioning effect. These button-buffers also coöperate with the deep bottom or recess in the buffer-brackets, whereby the buffer is caused to be collapsed below the plane of its base, and this deep bottom of the bracket-base and the provision of the staff-buffer allow the rubber buffer to be made comparatively flat. This construction prevents any movement of the rim of the buffer in the sealing-groove of the holder, so that there can be no rubbing and wear to the sealing function of the rim. It is this construction of the grooved and deep bracket and the rimmed rubber buffer that gives long life to the buffer, and its rim aids in the efficiency of the flat form of the buffer and in allowing it to be indented below the plane of the sealing-rim. The seating-holder for the pneumatic rubber buffer has a central opening 19 of about a sixteenth of an inch in diameter for the escape and inlet of the air, as seen in Figs. 4, 14ᵃ, and 14ᵇ. In Fig. 14 I have shown this vent as being perpetually open, and I may use with it a flexible valve 26, preferably of rubber, seated in a recess in the back of the buffer-holder, as best seen in Figs. 14ᵇ and 9ᵃ, and has a central opening 14 about a thirty-second of an inch or about half the size of the vent 19 in the buffer-holder and which is also perpetually open for the inlet and outlet of the air. This valve is preferably seated in an undercut groove, by which it is securely self-retained in place against the wall of the buffer-holder, and it has a series of holes 27 around the small vent 14 for the purpose of allowing a free egress of the air when the buffer is being collapsed. These openings 27 are closed when the valve is flush upon its seat, as seen in Figs. 13 and 14ᵃ, and in this position the air is sucked into the buffer through the small central vent only. In collapsing the buffer this flexible valve will have a bulging function or form, so as to carry it away from its seat by the force of the outgoing air, and thus permit the air to escape through all the holes in the valve. Immediately after the air has been forced out of the buffer the flexible valve will at once resume its normal seating position, and thereby close all its air-openings except the central vent, which is always open.

Referring to Figs. 4 and 14ᵇ, the buffer-holder is seen as formed with an interior recess or chamber 28, and the buffer being sealed and secured upon the raised surface 16 will allow the crown of the buffer to be collapsed within the bottom of the holder and beyond the line of its sealing-base, and this gives the advantage of using a comparatively flat concavo-convex buffer, and thereby allows it to collapse without danger of cracking, and thereby greatly prolongs the life of the buffer.

Looking at Fig. 14, it is seen by dotted lines how the shuttle is received against the picker with a comparatively soft blow, because the picker-staff itself is the means, by reason of resting against the pneumatic rubber buffer, of yielding under such blow, and this is the reason why the shuttle is retained against the picker to be thrown without hammering effect of the picker upon the shuttle. In this figure is also seen the cushioning of the picker-staff in throwing the shuttle.

In Figs. 14 and 14ᵇ it is seen how the pneumatic rubber buffer may be collapsed without endangering its cracking and by which it is caused to resume its normal expanded shape.

In Figs. 15 and 16 I have shown a thin leather buffer 25 and the check-strap 26' as now used to sustain the blow of the picker-staff caused by the shuttle coming in contact with it, and in Fig. 16 I have shown the block-leather buffer 27' at the end of the shuttle-race box as now used for receiving the leather picker 28' for stopping the cam-actuated throw of the picker-staff in throwing the shuttle across the lay through the open shed to the opposite shuttle-box. The buffer may also be reinforced by cloth embedded in it or upon its inner or outer wall for increasing its durability, as shown at 29 in Fig. 10; but the important function of this fabric layer is to prevent the stretching of the rubber body when struck by the picker-staff buffer. In the absence of such non-stretching element in the rubber buffer I have found that while it was less durable the stretching would cause the air to remain in the chamber when collapsed, and thus cause rebound; but the provision of the non-stretching rubber buffer causes it to give a better resistance, without rebound, to the impact of the staff-buffer, because the harder the buffer is struck the greater will be the resistance. A rubber buffer that would stretch would defeat this result, because the resistance of the impact would be limited by the stretching of the rubber buffer.

I have stated that the rubber buffer is in form preferably less than a hemisphere, and it is this construction whereby it is caused to assume its normal form after it is released from the pressure of the picker-staff or picker and by which it is caused to draw air within it without giving any rebounding effect to the buffer upon the picker-staff or to the shuttle, and this important result is due to the construction, form, and manner of seating and holding the buffer and delivering the blow upon the crown of the buffer by a convex button of less area than the buffer-surface, as seen in Fig. 14ᵇ.

In changing or sliding box looms my pneumatic rubber buffer will be used back of the sliding picker 24, as well as back of the picker-staffs, as in Fig. 17, wherein the sliding picker is seen in contact with the buffer.

The position and location of the pneumatic buffer may be at the top of the lay or wherever it may be advantageously used to receive the blows of the shuttle, picker-staff, and of the picker, and as to the rubber buffer and manner of applying it changes may be made without departing from the spirit of my invention.

The button-buffer on the picker-staff may be of hard rubber or leather; but I prefer a hard smooth wood.

I claim—

1. The combination in a loom, with the race-lay beam, the picker-staffs and their operating mechanism, of pneumatic rubber buffers having each a form less than half a sphere terminating in a base peripheral flange, and a holder for said buffer having an inclosed seating and self-locking groove for said flange and a perpetually open vent.

2. The combination in a loom, the race-lay, the picker-staffs and their operating mechanism, with a bracket device secured to the race-lay at each end of the picker-staff slot and formed with a base having a vent and an annular groove overhanging the base, and a pneumatic rubber cup terminating at its base in an outward-extending rim or flange adapted to be interlocked with a sealing-joint within said base-groove.

3. The combination in a loom with its race-lay, of picker-staffs each provided with button-buffers, and a bracket device secured to the race-lay at each end of the picker-staff slot and having a vent and circumferential groove overhanging the base, and pneumatic rubber cups each formed at its base with a peripheral outward-extending rim adapted to fill and be interlocked in the said base-groove.

4. In a loom, a pneumatic picker-staff buffer comprising a bracket having attaching means and provided with a seat having an aperture and an undercut marginal wall, a rubber air-sealing ring fitting the base of said seat, and a concavo-convex rubber cup provided with a peripheral flange adapted to be sprung under and engage said undercut wall.

5. In a loom, a pneumatic picker-staff buffer, comprising a bracket or attaching-plate provided with a seat having a recessed and apertured base and an undercut flaring marginal wall, a rubber air-sealing ring fitting the base and the undercut of the recess, and a concavo-convex rubber buffer provided with a flaring or inclined peripheral flange or rim adapted to be sprung under and into said undercut.

6. The rubber buffer in the form of a concavo-convex cup and provided with a peripheral attaching-flange having a flat base and an inclined or wedge-like outer side.

7. In a loom, a buffer for the impact of picker-staffs, comprising a bracket-base having a rim overhanging the face of the base and a groove around the inner wall of the rim above the surface of the base, and a rubber cup-buffer having an outward-standing rim or flange around its base edge, whereby it is supported in the groove above the base-surface to give increased depth to the buffer-chamber for the purpose stated.

8. A buffer-bracket for looms comprising an attaching-arm, a base-plate at right angles thereto having a peripheral rim overhanging the face of the base, and an annular groove in the inner wall of the rim above the surface of the base.

9. In a loom, in combination with the picker-staffs having button-buffers, of pneumatic rubber buffers formed with a circumferential rim or flange joining the spherical projection and a fabric layer extending to the edge of the rim for the purpose stated.

10. In a loom, a pneumatic buffer for the picker-staffs comprising a concavo-convex rubber body having a circumferential attaching-flange and a reinforcing cloth layer whereby it is rendered non-stretching under impact.

11. In a loom, a pneumatic picker-staff buffer comprising a bracket or attaching-plate having a vent, a concavo-convex rubber body secured to and projecting from one side of said plate, a flexible valve having a vent coincident with the plate-vent and secured thereto on the other side of its vent.

12. In a loom, a pneumatic picker-staff buffer comprising a bracket-attaching plate having an apertured base provided with an annular seat and an undercut marginal wall flange or lip overhanging said seat on one side of the base-plate, a concavo-convex rubber body having a circumferential flange or rim self-engaging with said wall, means for sealing the buffer-engaging rim upon its seat, an annular recess on the other side of the base-plate, having an undercut marginal wall flange or lip overhanging said recess, and a flexible valve having a vent registering with said base-aperture, openings surrounding said vent, and rendered self-engaging with said overhanging flange or lip.

13. In a loom, a pneumatic picker-staff buffer comprising a bracket-attaching plate having a vent, a concavo-convex rubber body secured to and projecting from one side of said plate, and a flexible valve having a vent registering with the plate-vent and secured thereto on the other side of said vent, the valve-vent being smaller than the plate-vent.

14. In a loom, a pneumatic picker-staff buffer comprising a bracket-attaching plate having a vent, a concavo-convex rubber cup secured to and projecting from one side of said plate, a flexible valve having a vent registering with and smaller than the plate-vent, and having openings around its vent of greater area than the plate-vent.

15. In a loom, a pneumatic picker-staff buffer comprising a bracket-attaching plate having a vent, a concavo-convex rubber buffer secured to the plate on one side of its vent, a flexible valve secured to the plate on the other side of its vent and having both inlet and outlet openings, the latter being of greater area than the inlet-openings.

16. In a loom, a pneumatic picker-staff buffer comprising a bracket-attaching plate having a vent, a concavo-convex rubber buffer secured to the plate on one side of its vent, a flexible valve having a vent smaller than and registering with the plate-vent secured to the plate on the other side of the plate-vent, and having openings around its vent of greater area than the plate-vent, opened by the outflow pressure of the air by the collapsing of the buffer and closed by the walls of the plate in the normal condition of the valve.

17. A pneumatic rubber buffer device for the shuttle and picker-staffs for looms comprising in a bracket device, an attaching-arm, a base depending therefrom, a groove surrounding the base, an apertured recess forming a base-vent chamber in the face of the base below the plane of the groove, and a rubber cup terminating at its base in a rim or flange the counterpart of the groove, whereby the cup is secured, sealed and allowed to be collapsed within the base.

18. In a loom, a buffer for the impact of the picker-staff composed of an imperforate rubber impact-surface of a form less than half a sphere, a suitable seat and casing therefor, forming an air-chamber of fixed area and an unvalved opening from said chamber.

19. In a loom, a buffer for the impact of the picker-staff composed of an imperforate rubber impact-surface of a form less than half a sphere, a suitable seat and casing therefor, forming an air-chamber and an unvalved opening from said chamber.

20. In a loom, a buffer for the impact of the picker-staff composed of a rubber impact-surface, a suitable seat therefor, a chamber behind said impact-surface extending below the plane of said seat and an unvalved opening from said chamber.

21. In a loom, the combination of a picker-staff, the race-lay and the shuttle, of a buffer for the impact of the picker-staff composed of an imperforate rubber pneumatic impact-surface, a suitable seat therefor, and an air-chamber of fixed area behind and below the plane of said seat having a perpetually open vent, whereby the blow of the picker-staff is delivered without resilient effect thereon.

In testimony whereof I affix my signature in presence of two witnesses.

FRANCIS ARTHUR MILLS.

Witnesses:
A. ROLAND JOHNSON,
G. B. EMMONS.